United States Patent [19]

Dias da Silva

[11] Patent Number: 5,769,019
[45] Date of Patent: Jun. 23, 1998

[54] PROTECTIVE COVERING FOR OUTDOOR STRUCTURES

[76] Inventor: Luiz F. Dias da Silva, 13264 Heiden Cir., Lake Bluff, Ill. 60044

[21] Appl. No.: 671,628

[22] Filed: Jun. 27, 1996

[51] Int. Cl.[6] ....................................................... B63B 1/34
[52] U.S. Cl. ............................................................. 114/67 R
[58] Field of Search ................................... 114/67 R, 219, 114/67 A, 228

[56] References Cited

U.S. PATENT DOCUMENTS

| | | | |
|---|---|---|---|
| 4,375,199 | 3/1983 | Graeme-Barber et al. | 114/67 R |
| 4,751,113 | 6/1988 | Riccio et al. | |
| 5,225,812 | 7/1993 | Faghri | 114/228 |
| 5,354,603 | 10/1994 | Errede et al. | |
| 5,357,890 | 10/1994 | Mason, Jr. et al. | |

FOREIGN PATENT DOCUMENTS

| | | |
|---|---|---|
| 2157074 | 6/1973 | France . |
| 1 300 132 | 12/1972 | United Kingdom . |

*Primary Examiner*—Stephen Avila
*Attorney, Agent, or Firm*—Foley & Lardner

[57] ABSTRACT

A method of protecting a hull of a marine craft from adhesion of marine growths and inorganic deposits includes a step of applying protective covering sheets to the hull in a pattern that provides substantially complete coverage of at least the portion of the external surface that is submerged during normal use. The sheets have an outer surface consisting essentially of a polymer such as PTFE that resists adhesion of marine growths and inorganic deposits, and an inner surface comprising a water-resistant adhesive effective to secure the sheets to the outer hull surface and prevent the sheets from coming off. The invention further provides a boat hull or other outdoor structure or vehicle that is protected with sheets according to the described method.

20 Claims, 1 Drawing Sheet

U.S. Patent    Jun. 23, 1998    5,769,019
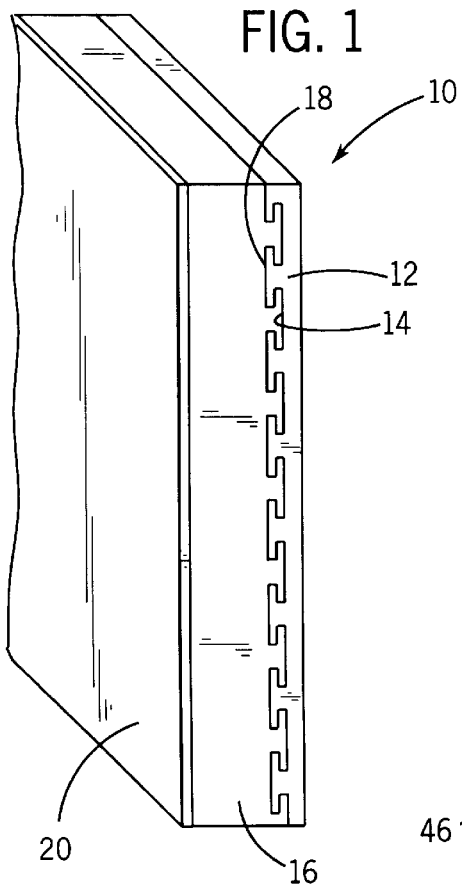
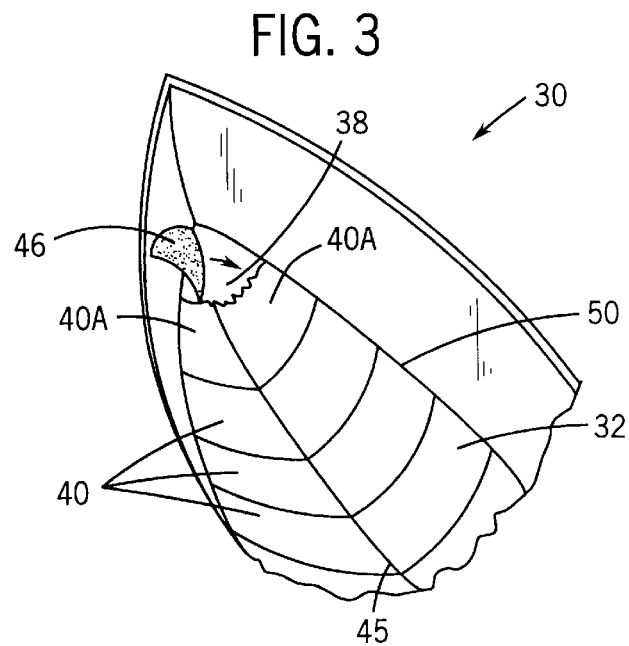
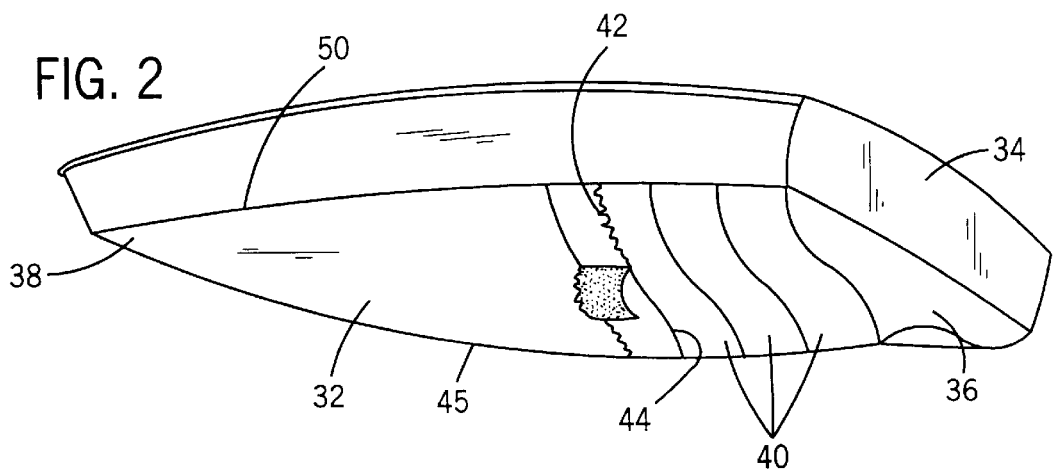

5,769,019

PROTECTIVE COVERING FOR OUTDOOR STRUCTURES

TECHNICAL FIELD

The invention relates to protective coverings for marine structures such as boat hulls and other outdoor structures such as planes and motor vehicles that are exposed to the elements.

BACKGROUND OF THE INVENTION

Hulls of marine craft that remain in the water for extended periods of time corrode and develop marine growth and inorganic deposits. Adhesion of contaminants to a hull adds to the overall weight of the craft and increases its drag resistance. In smaller craft such as pleasure boats, the hull becomes dirty and discolored and must be cleaned frequently for aesthetic reasons even if the contaminants do not have much effect on the boat's performance. Removal of deposits and marine growth from a boat hull is a laborious process that requires the use of hazardous chemicals such as concentrated muriatic acid.

A number of products have been proposed for reducing the adhesion or formation of contaminants on marine craft hulls. Waxes, paints and other protective coatings have been tried, but have not been commercially successful because such coverings fail to prevent the adhesion of contaminants. Moreover, the coatings themselves erode over time. The most commonly used coatings consist of $CuO_2$ paint which presents several ecological and pollution hazards.

An other previously proposed solution involves spraying marine craft hulls with a fluorocarbon plastic such as polytetrafluoroethylene (PTFE) in order to provide an external covering that resists adhesion and reduces drag as the craft moves through the water. PTFE has the properties needed to achieve these effects, but it is highly unreactive and cannot readily be coated with sufficient adhesion onto a surface such as painted wood or fiberglass. Spraying on a PTFE coating material is likely to result in inconsistent application across the hull, leaving some areas with little or no coverage.

The application of sheets of plastic such as polyethylene (PE) and PTFE has been proposed, but no practical way of mounting such sheets to an outdoor structure, particularly a surface that is submerged in water such as boat hull, has been provided. Thus, a need persists for an easy-to-apply and effective covering that prevents corrosion and the adhesion of marine growth to marine craft. The problem is most acute among small pleasure boats that must be cleaned each boating season.

SUMMARY OF THE INVENTION

A method of protecting a hull of a marine craft from adhesion of marine growths and inorganic deposits according to the invention includes a step of applying protective flexible covering sheets to the hull in a pattern that provides substantially complete coverage of at least the portion of the external surface that is submerged during normal use of the marine craft. The sheets have an outer surface consisting essentially of a polymer such as PTFE that resists adhesion of marine growths and inorganic deposits, and an inner surface comprising a water-resistant adhesive effective to secure the sheets to the outer hull surface and prevent the sheets from coming off during normal use. The invention further provides a boat hull or other outdoor structure or vehicle that is protected with sheets according to the foregoing method.

According to a preferred embodiment, the sheets comprise a trilaminate of an outer layer consisting essentially of a polyhalocarbon composed of units of the formula $-(CX_2-CX_2)_n-$, wherein X is selected from the group consisting of hydrogen, a halogen, or a halogen-substituted side chain, provided that at least one X is not hydrogen, an inner layer comprising the water-resistant adhesive, and an intermediate layer comprising a plastic other than a polyhalocarbon to which the inner and outer layers are securely laminated. Alternatively, sheets consisting of a polyhalocarbon layer to which an adhesive layer has been mechanically attached may be used. Various objects, features and advantages of the invention will become apparent from the following detailed description.

BRIEF DESCRIPTION OF THE DRAWINGS

The invention will be described with reference to the accompanying drawings, wherein like numerals denote like elements, and:

FIG. 1 is an enlarged, partial perspective view of a trilaminate sheet according to the invention;

FIG. 2 is a perspective view of a small boat with the protective covering of the invention partially applied across the hull; and FIG. 3 is a partial perspective view of the boat hull of FIG. 2 almost completely covered by the protective covering.

DETAILED DESCRIPTION OF PREFERRED EMBODIMENTS

Application of an adhesion-resistant polymer such as PTFE to the external surface of a boat hull made of typical materials such as wood, metal (e.g., aluminum), plastic or fiberglass is difficult because the non-reactive nature of PTFE makes it difficult to adhere to an underlying substrate. The same adhesion resistance that makes the material successful for protecting the hull from deposits also makes it hard to secure to a surface. Thus, although coating methods such as spraying and the like could be used to apply a PTFE Layer to a outdoor structure such as a boat hull, it is preferred according to the invention to use preformed adhesively backed sheets of PTFE that can be applied to a new boat hull, or even retrofitted to the hull of a used boat.

FIG. 1 illustrates a trilaminate sheet 10 usable in the invention. Sheet 10 comprises an outer layer 12 made of an adhesion-resistant polymer laminated on a intermediate layer 16 made of a flexible plastic substrate material. An inner layer 20 is laminated onto the opposite side of intermediate layer 16. In the illustrated embodiment, intermediate layer 16 has a series of T-shaped grooves 18 that provide a mechanical interlock 14 with corresponding T-shaped projections of outer layer 12.

The polymeric material of outer layer 12 must resist corrosion and the adhesion of marine growth and other contaminants in fresh and/or salt water. For this purpose, outer layer 12 preferably consists essentially of a polyhalocarbon of units of the formula $-(CX_2-CX_2)_n-$, wherein X is selected from the group consisting of hydrogen, a halogen, or a halogen-substituted side chain such as a fluorine-substituted alkyl group having the formula $-C_nF_{2n}-1$ or a fluorine-substituted alkoxy group having the formula $-OC_nF_{2n}-1$, provided that at least one X per unit is not hydrogen. Polymers of this family are known to form durable, unreactive, adhesion-resistant coatings. Teflon (polytetrafluoroethylene, PTFE) is most preferred for use in the invention because of its availability and highly favorable properties. Other similar polyfluorocarbons closely related to PTFE and useful for purposes of the present invention include TFEP (fluorinated ethylene-propylene), ETFE (ethylene-tetrafluoroethylene copolymer), PFA (perfluoroalkoxy-ethylene), CTFE (chlorotrifluoroethylene), E-CTFE (ethylene-chlorotrifluoroethylene copolymer), PVF2 (vinylidene fluoride) or even PVF (polyvinyl fluoride, —($CH_2$—CHF)$_n$—).

The unreactive nature of polyfluorocarbons, especially Teflon, makes it difficult to apply a coating of the polyfluorocarbon directly to the surface to be protected. A PTFE powder could, for example, be mixed with an adhesive and sprayed onto a precleaned or virgin surface made of fiberglass or similar material, but such a coating would lack smoothness and completeness as noted above. Accordingly, it is preferred to use a trilaminate sheet 10 comprising a smooth, non-porous, outer layer 12 of Teflon or one of the comparable polymeric materials discussed above. Teflon sheets having this construction are commercially available from Lamart under the trademark T-18 Teflon Tape and have been sold for use in conveyer belt coatings, liners for product chutes and painting booths, electrical insulation, and corrosive chemical operations. Outer layer 12 is preferably at least about 1 mm thick.

Intermediate layer 16 may be made of any plastic different from that of outer layer 12 and suitable for lamination with both adhesive inner layer 20 and adhesion-resistant outer layer 12. In the illustrated embodiment, intermediate layer 16 is made of vinyl with a thickness of at least about 8 mm. Inner adhesive layer 20 consists essentially of a waterresistant adhesive such as a silicone or acrylic adhesive that secures the covering sheet to the hull surface. The inner adhesive layer secures the trilaminat,e covering to the surface of a marine craft hull over repeated uses, preferably for a year or longer of continuous immersion.

Sheets 10 may be of any dimensions suitable for the surface to be protected. However, for the protection of small boats, i.e., under 60 feet in length, especially under 30 feet, sheets 10 preferably have widths in the range of from 6 to 18 inches to provide ease of handling. The composition, dimensions and thickness of sheets 10 must provide a material that is flexible enough to adapt to the contours of the hull or other surface.

In accordance with the method of the invention, it is preferred to prepare the surface of the boat hull prior to application of sheets 10 in order to ensure that the adhesive bonds properly. For this purpose, the hull external surface should first be cleaned, if necessary, and allowed to dry. Any prior loose coating material should be removed. The hull surface is then preferably roughened to provide a better surface for attachment, as by using a chemical etchant or an abrasive material. Sheets 10 are then manually mounted on the hull surface by means of the inner adhesive layer, and air bubbles are removed insofar as possible.

Due to the irregular shape of a boat hull, sheets 10 are best attached to the hull in a pattern resembling fish scales, such that each sheet overlaps an edge portion of another sheet. For best performance in the water, sheets 10 should be mounted so that the exposed edge of each overlapping pair of edges faces rearwardly, as discussed below. Joints in the resulting covering may be sealed with any suitable caulking material, preferably using a Teflon-based caulk that has properties similar to those of the Teflon-coated sheets.

FIGS. 2 and 3 illustrate the application of a protective covering according to the invention to a hull 32 of a small boat 30. Hull 32 is typically made of wood, aluminum or fiberglass. Before applying sheets such as trilaminate sheets 10 to boat 30, a surface of hull 32 is cleaned, roughened with abrasives and etched with products such as SKIP SAND. Starting from a stern 34 of boat 30, a single sheet 36 is cut to size and mounted to cover the transom area of hull 32 up to the normal water line 50. Hull 32 is then covered by a succession of profiled sheets 40 having the same composition as sheet 10 described above in such a way that an overlying edge 44 of one sheet overlaps an underlying edge 42 of an adjacent sheet. Underlying edge 42 is preferably a scalloped edge 42 forming a series of cut-away portions through which overlying edge 44 of the pair can be directly adhered to the external surface of the hull.

Sheets 40 are elongated and applied so that the lengthwise direction of each sheet is transverse to the lengthwise imaginary centerline of the hull. Edges 42, 44 thus also extend transversely to the lengthwise imaginary centerline of the hull. If the hull has a lengthwise central fin or stabilizing spine 45, each sheet 40 may have a length equal to about half the width of the hull bottom, and sheets 40 may be arranged side-by-side in pairs on opposite sides of the spine 45 (see FIG. 3).

Air bubbles are continuously removed by smoothing of sheets 40 as each sheet 40 is adhered to boat hull 32. Sheets 40 are trimmed at normal water line 50 of boat 30. When prow 38 of boat hull 32 is reached, a single triangular protective end sheet 46 is applied to prow 38 such that end sheet 46 covers the edges of the two adjacent, tapering sections 40a. The joint along spine 45 may be sealed with Teflon caulk. If necessary, sheets of the protective material can be placed on the sides of the hull as well, either as overlapping sheets similar to sheets 40, or as long single sheets. Use of a series of smaller sheets is preferred because large adhesive sheets are difficult to work with.

The method of the invention offers a number of advantages over other known forms of hull protection, especially for small craft as discussed above which are not difficult to remove from the water so that the hull can be conveniently positioned for application of the sheets. Since the polymeric material has a low friction coefficient, the covering also reduces the water flow friction over the hull.

Fresh water tests have surprisingly confirmed that sheets such as Lamart T-18 Teflon Tape have the ability to last through an entire boating season without coming off. The tests sheets had very little growths and deposits thereon in comparison to surrounding surfaces of the hull which were unprotected or protected with copper oxide, a common commercially available protective coating. Further, to the extent there were slight deposits on the protective sheet, it was possible to easily remove such deposits without scrubbing. The layout of overlapping sheets is useful in that a single damaged sheet can be replaced without having to recoat the entire hull surface, and that damage to the protective coating can be easily observed.

It will be understood that the foregoing description is of preferred exemplary embodiments of the invention, and that the invention is not limited to the specific forms shown. For example, other surfaces such as dock pilings/platforms, pontoons, navigational buoys, submersibles, snowmobiles, airplanes and water intakes for dams, power stations and treatment plants could all be protected by the covering of the invention. These and other modifications may be made in the design and arrangement of the elements without departing from the scope of the invention as expressed in the appended claims.

I claim:

1. A method of protecting a hull of a marine craft from adhesion of marine growths, the method comprising the steps of applying flexible protective covering sheets to the hull in a pattern that provides substantially complete coverage of at least a portion of an external surface that is submerged during normal use of the marine craft, wherein the sheets have a non-poreus outer surface consisting essentially of a polymer that resists adhesion of marine growths and inorganic deposits, and an inner surface comprising a water-resistant adhesive effective to secure the sheets to the outer hull surface and prevent the sheets from coming off during normal use of the marine craft.

2. The method of claim 1, wherein the sheets are retrofitted to a marine craft that has already been used in water, further comprising a step of cleaning the external surface of the hull of the craft to an extent sufficient to permit firm bonding of the water-resistant adhesive to the external surface.

3. The method of claim 1, wherein the small marine craft is less than 60 feet in length and the sheets have been applied so that edges thereof between adjacent sheets overlap.

4. The method of claim 1, wherein the hull comprises wood, metal or fiberglass.

5. The method of claim 1, further comprising a step of etching the hull prior to applying the protective covering sheets in a manner effective to promote adhesion of the protective covering sheets to the hull.

6. The method of claim 2, further comprising a step of etching the hull prior to applying the protective covering sheets in a manner effective to promote adhesion of the protective covering sheets to the hull.

7. A method of protecting a hull of a marine craft from adhesion of marine growths, the method comprising the steps of applying flexible protective covering sheets to the hull in a pattern that provides substantially complete coverage of at least a portion of an external surface that is submerged during normal use of the marine craft, wherein the sheets comprise a trilaminate of:

an outer layer consisting essentially of a polyhalocarbon that resists adhesion of marine growths and inorganic deposits, the polyhalocarbon of the formula $-(CX_2-CX_2)_n-$, wherein X is selected from the group consisting of hydrogen, a halogen, or a halogen-substituted side chain, provided that at least one X is not hydrogen;

an inner layer comprising a water-resistant adhesive effective to secure the sheets to the outer hull surface and prevent the sheets from coming off during normal use of the marine craft; and an intermediate layer comprising a plastic other than a polyhalocarbon to which the inner and outer layers are securely laminated.

8. The method of claim 7, wherein the outer layer of the trilaminate consists essentially of PTFE.

9. The method of claim 7, wherein the inner layer of the trilaminate consists essentially of a silicone or acrylic adhesive.

10. The method of claim 8, wherein the inner layer of the trilaminate consists essentially of a silicone or acrylic adhesive, and the intermediate layer comprises a vinyl substrate having a thickness greater than the thicknesses of the inner and outer layers.

11. The method of claim 7, wherein the intermediate layer consists essentially of vinyl.

12. The method of claim 7, wherein the outer layer has a thickness of at least about 1 mm.

13. The method of claim 12, wherein the flexible sheet material has a thickness of at least about 8 mm.

14. A protected marine craft hull, comprising a hull having an external covering of protective covering sheets adhered to the hull in a pattern that provides substantially complete coverage of at least a portion of an external surface that is submerged during normal use of the marine craft, wherein the sheets have a non-poreus outer surface consisting essentially of a polymer that resists adhesion of marine growths and inorganic deposits, and an inner surface comprising a water-resistant adhesive effective to secure the sheets to the outer hull surface and prevent the sheets from coming off during normal use of the marine craft.

15. The protected marine craft hull of claim 14, wherein at least some of the sheets are elongated and applied so that a lengthwise direction of each sheet is transverse to a lengthwise imaginary centerline of the hull, and such sheets are arranged so that edges of adjacent sheets which extend transversely to the lengthwise imaginary centerline of the hull overlap each other.

16. The protected marine craft hull of claim 15, wherein the marine craft is less than 60 feet in length and the hull comprises wood, metal or fiberglass.

17. The protected marine craft hull of claim 14, wherein the sheets comprise a trilaminate of:

an outer layer consisting essentially of a polyhalocarbon of the formula $-(CX_2-CX_2)_n-$, wherein X is selected from the group consisting of hydrogen, a halogen, or a halogen-substituted side chain, provided that at least one X is not hydrogen;

an inner layer comprising the water-resistant adhesive; and an intermediate layer comprising a plastic other than a polyhalocarbon to which the inner and outer layers are securely laminated.

18. The protected marine craft hull of claim 17, wherein the outer layer of the trilaminate consists essentially of PTFE and the inner layer of the trilaminate consists essentially of a silicone or acrylic adhesive.

19. The protected marine craft hull of claim 15, wherein joints between sheets are sealed with a caulk material.

20. The protected marine craft hull of claim 15, wherein an underlying one of each pair of the edges of adjacent sheets has a series of cut-away portions through which an overlying edge of the pair can be directly adhered to the external surface of the hull.

* * * * *